(12) United States Patent
Diab et al.

(10) Patent No.: US 9,391,870 B2
(45) Date of Patent: *Jul. 12, 2016

(54) METHOD AND SYSTEM FOR SYMMETRIC TRANSMIT AND RECEIVE LATENCIES IN AN ENERGY EFFICIENT PHY

(71) Applicant: Broadcom Corporation, Irvine, CA (US)

(72) Inventors: Wael William Diab, San Francisco, CA (US); Scott Powell, Alisa Viejo, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/908,108

(22) Filed: Jun. 3, 2013

(65) Prior Publication Data

US 2014/0153401 A1 Jun. 5, 2014

Related U.S. Application Data

(63) Continuation of application No. 12/702,141, filed on Feb. 8, 2010, now Pat. No. 8,462,674.

(60) Provisional application No. 61/184,263, filed on Jun. 4, 2009.

(51) Int. Cl.
*H04L 12/727* (2013.01)
*H04L 12/12* (2006.01)
(Continued)

(52) U.S. Cl.
CPC .............. *H04L 45/121* (2013.01); *H04L 12/12* (2013.01); *H04L 43/0852* (2013.01);
(Continued)

(58) Field of Classification Search
CPC ...... H04L 43/0852; H04L 12/12; Y02B 60/34
USPC .................. 370/229, 235, 236, 276, 282, 284
See application file for complete search history.

(56) References Cited

U.S. PATENT DOCUMENTS 7,447,155 B2 * 11/2008 Tang .............................. 370/235
7,603,574 B1 * 10/2009 Gyugyi et al. ................ 713/300
(Continued)

FOREIGN PATENT DOCUMENTS

EP 1473870 11/2004
EP 1484876 12/2004
(Continued)

OTHER PUBLICATIONS

Teener, "Audio/Video Bridging for Home Networks (IEEE 802.1 AV Bridging Task Group)" [Online], Jun. 1, 2007.
(Continued)

*Primary Examiner* — Siming Liu
(74) *Attorney, Agent, or Firm* — Foley & Lardner LLP; Christopher J. McKenna; Helen H. Zhang

(57) ABSTRACT

Aspects of a method and system for symmetric transmit and receive latencies in an energy efficient PHY are provided. In this regard, a delay introduced by a PHY of a network device for outbound traffic and a delay introduced by the PHY for inbound traffic may be controlled such that a transmit delay of the network device is equal, within a tolerance, to a receive latency of the network device. The delays may be controlled based on whether one or more energy efficiency features are enabled in the PHY. The delay introduced by the PHY for outbound traffic may be controlled based on an amount of buffered inbound traffic. The delay introduced by the PHY for inbound traffic may be controlled based on an amount of buffered outbound traffic. The delays may be controlled such that said receive latency and the transmit latency are approximately constant regardless of a mode of operation of the network device.

20 Claims, 4 Drawing Sheets

(51) Int. Cl.
*H04L 12/26* (2006.01)
*H04L 12/801* (2013.01)

(52) U.S. Cl.
CPC ............... *H04L 47/12* (2013.01); *Y02B 60/34* (2013.01); *Y02B 60/35* (2013.01); *Y02B 60/43* (2013.01); *Y02B 60/44* (2013.01)

(56) References Cited

U.S. PATENT DOCUMENTS

| | | | |
|---|---|---|---|
| 8,462,674 B2 * | 6/2013 | Diab et al. | 370/284 |
| 2006/0034295 A1 | 2/2006 | Cherukuri et al. | |
| 2007/0280239 A1 | 12/2007 | Lund | |
| 2008/0080496 A1 | 4/2008 | Slaight | |
| 2008/0080562 A1 | 4/2008 | Burch et al. | |
| 2008/0117938 A1 | 5/2008 | Erich et al. | |
| 2008/0225841 A1 | 9/2008 | Conway et al. | |
| 2009/0067844 A1 * | 3/2009 | Archambault et al. | 398/81 |
| 2009/0119524 A1 | 5/2009 | Hays | |
| 2010/0128738 A1 * | 5/2010 | Barrass | 370/445 |
| 2010/0241880 A1 | 9/2010 | Wertheimer et al. | |
| 2010/0262848 A1 | 10/2010 | Bobrek et al. | |
| 2010/0309932 A1 | 12/2010 | Diab et al. | |

FOREIGN PATENT DOCUMENTS

| | | |
|---|---|---|
| EP | 1494407 | 1/2005 |
| GB | 2337672 A | 11/1999 |
| WO | WO 0031923 | 6/2000 |

OTHER PUBLICATIONS

Grow, "'802.1 and Energy Efficient Ethernet," Sep. 11, 2007, pp. 1-6.
Bennett et al., "Energy Efficient Ethernet," Jul. 16, 2007, pp. 1-70.
Gupta et al., "Dynamic Ethernet Link Shutdown for Energy Conservation on Ethernet Links," pp. 6156-6161, Jun. 2007.
Wael Diab, "Energy Efficient Ethernet and 802.1," IEEE 802 Plenary, Nov. 16, 2007.

* cited by examiner

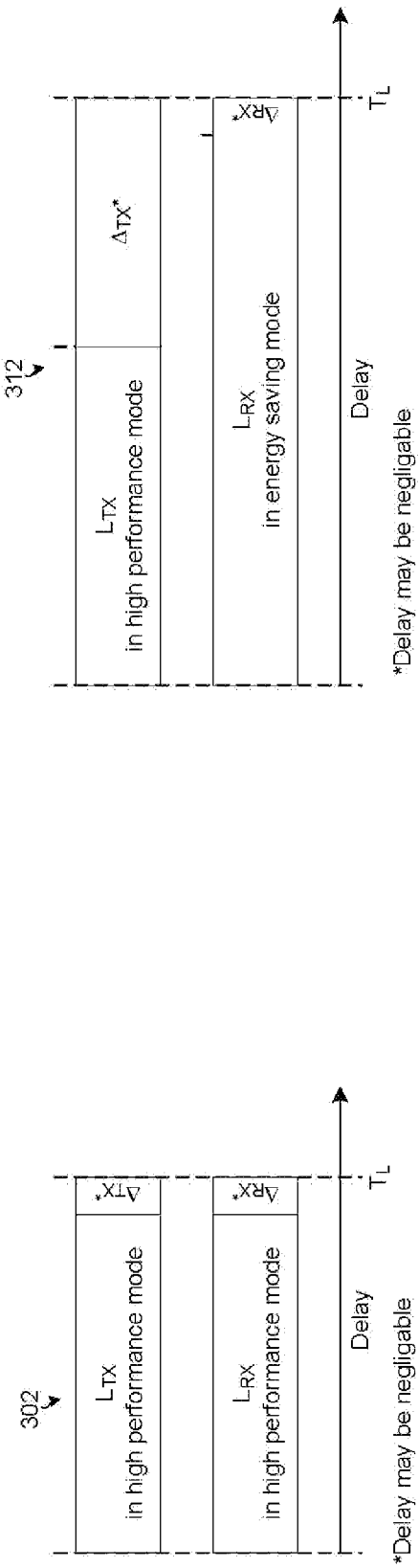
FIG. 3A
FIG. 3B
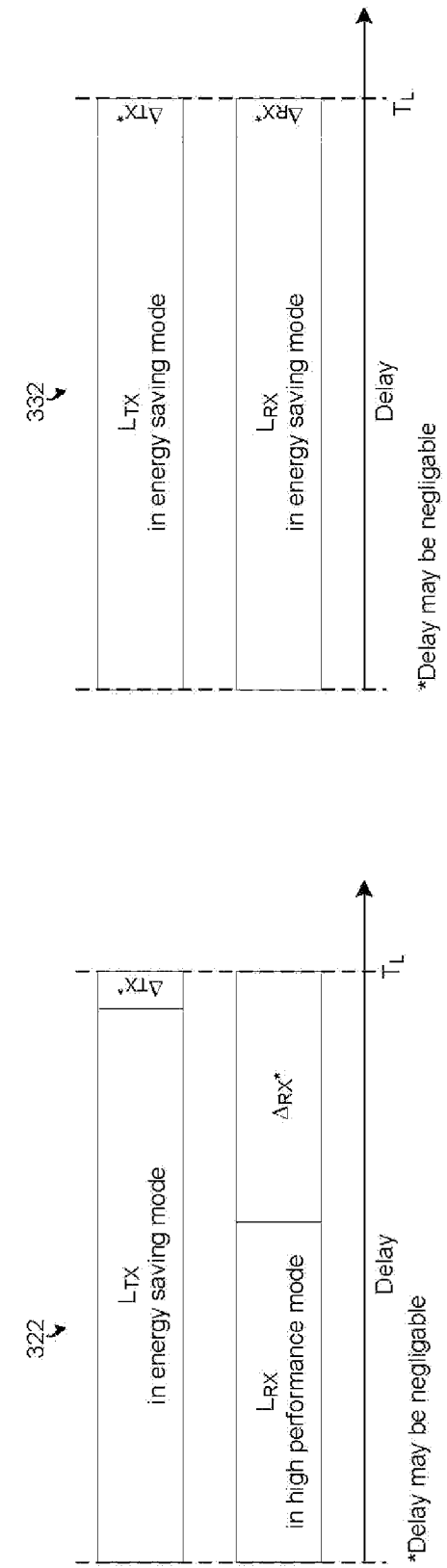
FIG. 3C
FIG. 3D

METHOD AND SYSTEM FOR SYMMETRIC TRANSMIT AND RECEIVE LATENCIES IN AN ENERGY EFFICIENT PHY

CROSS-REFERENCE TO RELATED APPLICATIONS/INCORPORATION BY REFERENCE

This patent application is a continuation of non-provisional application Ser. No. 12/702,141, filed Feb. 8, 2010, which makes reference to, claims priority to and claims benefit from U.S. Provisional Patent Application Ser. No. 61/184,263 filed on Jun. 4, 2009.

This application also makes reference to: U.S. patent application Ser. No. 12/470,970 filed on May 22, 2009; and U.S. patent application Ser. No. 12/480,658 filed on Jun. 8, 2009.

Each of the above stated applications is hereby incorporated herein by reference in its entirety.

FIELD OF THE INVENTION

Certain embodiments of the invention relate to networking. More specifically, certain embodiments of the invention relate to a method and system for symmetric transmit and receive latencies in an energy efficient PHY.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types, sizes for a variety of applications. In this regard, Ethernet networks are increasingly being utilized to carry, for example, voice, data, and multimedia. In this regard, people are relying more and more on the Internet and associated protocols such as Ethernet for the delivery of real-time and/or high quality content and/or information. However, delivery of such time-sensitive information creates a serious burden on networks and network designers.

Further limitations and disadvantages of conventional and traditional approaches will become apparent to one of skill in the art, through comparison of such systems with some aspects of the present invention as set forth in the remainder of the present application with reference to the drawings.

BRIEF DESCRIPTION OF SEVERAL VIEWS OF THE DRAWINGS

FIGS. 3A-3D illustrate exemplary controlling of delays in a PHY of a network device to compensate for different modes of operation in the PHY, in accordance with an embodiment of the invention.

DETAILED DESCRIPTION OF THE INVENTION

Certain embodiments of the invention may be found in a method and system for symmetric transmit and receive latencies in an energy efficient PHY. In various embodiments of the invention, a delay introduced by a PHY of a network device for outbound traffic and a delay introduced by the PHY for inbound traffic may be controlled such that a transmit delay of the network device is substantially equal to a receive latency of the network device. The PHY may be an Ethernet PHY. The delays may be controlled based on whether one or more energy efficiency features are enabled in the PHY. The delays may be controlled by controlling a size of one or more buffers, a threshold of one or more buffers, and/or a rate at which data is read out of one or more buffers. The delay introduced by the PHY for outbound traffic may be controlled based on an amount of buffered inbound traffic. The delay introduced by the PHY for inbound traffic may be controlled based on an amount of buffered outbound traffic and/or on a type of traffic being communicated by the network device. The delays may be controlled based on traffic patterns into and/or out of the PHY. The delays may be controlled such that said receive latency and the transmit latency are approximately constant regardless of a mode of operation of the network device.

Figure 1:
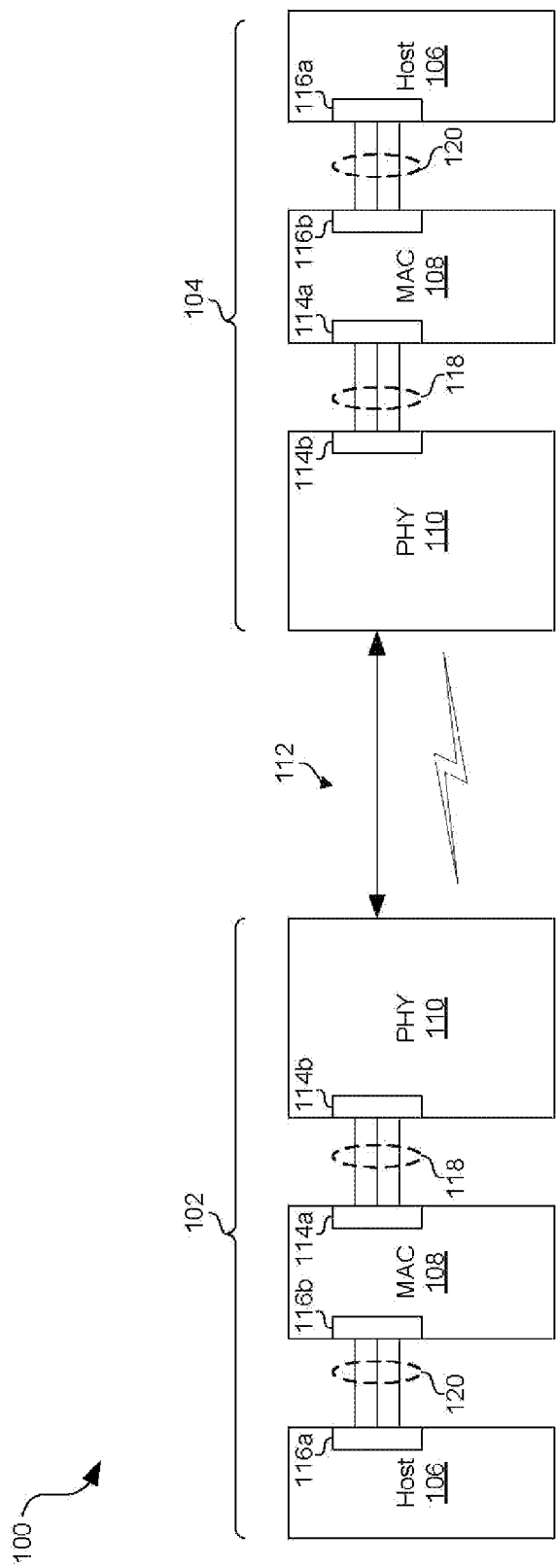
FIG. 1 is a block diagram illustrating an exemplary Ethernet connection between a two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a network device 102 and a network device 104. The network devices 102 and 104 may each comprise a host 106, a media access control (MAC) controller 108, and a PHY 110. The hosts 106 may be communicatively coupled to the MAC controllers 108 via interfaces 116a and 116b. The MAC controllers 108 may be communicatively coupled to the PHY 110 via interfaces 114a and 114b.

The network devices 102 and 104 may be link partners that communicate via the link 112. The network device 102 and/or 104 may each comprise, for example, a desktop computer, a laptop computer, a server, a switch, a router, a bridge, or audio/video (A/V) enabled equipment. In this regard, A/V equipment may, for example, comprise a microphone, an instrument, a sound board, a sound card, a video camera, a media player, a graphics card, or other audio and/or video device. Accordingly, the network devices 102 and 104 may be operable to provide guaranteed quality of service (QoS) by utilizing protocols such as IEEE 1588 and/or the Audio Video Bridging (AVB) suite of protocols (e.g. IEEE 802.1AS) for the exchange of multimedia content and associated control and/or auxiliary data.

The hosts 106 may each comprise suitable logic, circuitry, interfaces, and/or code that may enable operability and/or functionality layers 7 through 3 of the OSI model, or internet, transport, and/or application layers of the TCP/IP model, for packets received and/or to-be-transmitted over the link 112. The hosts 106 may each comprise, for example, one or more processing subsystems, one or more memory or storage subsystems, one or more graphics subsystems, one or more audio subsystems, and one or data buses. The hosts 106 may comprise an interface 116a for communicating with a MAC controller 108 via a bus 120. The data bus 120 may, for example, be a PCI or PCI-X bus.

The MAC controllers 108 may comprise suitable logic, circuitry, interfaces, and/or code that may enable handling of OSI data link layer, or TCP/IP network access layer, operability and/or functionality. The MAC controllers 108 may, for example, be configured to implement Ethernet protocols, such as those based on the IEEE 802.3 standard, for example. Since each layer in the OSI and TCP/IP models provides a service to the immediately higher interfacing layer, the MAC controllers 108 may provide the necessary services to the hosts 106 to ensure that packets are suitably formatted and communicated to the PHYs 110. The MAC controllers 108 may each comprise an interface 116b for communicating with a host 106 via the bus 120. Also, the MAC controllers 108 may comprise one or more memory elements 115 for queuing received data and/or to-be-transmitted data.

Each of the MAC controllers 108 may also comprise an interface 114a for communicating with a PHYs 110 via a bus 118. The interface 114a may be, for example, a multi-rate capable interface and/or media independent interface (xxMII), where "xxMII" may correspond to, for example, SMII RGMIM, XGMII, SXGMII, QSGMII, etc. The interface 114a may enable transmission and/or reception of one or more data signals and one or more clock signals over the bus 118.

The PHYs 110 may each comprise suitable logic, circuitry, interfaces, and/or code that may enable communication, for example, transmission and reception of data, between the network device 102 and the network device 104 and may also be operable to implement one or more energy efficient networking (EEN) features. Each of the PHYs 110 may comprise an interface 114b for communicating with a MAC controller 108 via the bus 118. The interface 114b may be, for example, a multi-rate capable interface and/or media independent interface (MII). The interface 114b may enable transmission and/or reception of one or more data signals and one or more clock signals over the bus 118. Also, the PHYs 110 may comprise one or more memory elements 115 for queuing received data and/or to-be-transmitted data. In this manner, the PHY 110 may be operable to implement EEN features even when coupled to a legacy MAC that does not support or is unaware of the EEN features, as is described in U.S. patent application Ser. No. 12/470,970 entitled "Method and System for Control of Energy Efficiency and Associated Policies in a Physical Layer Device," referenced above.

The PHYs 110 may each comprise suitable logic, circuitry, interfaces, and/or code that may enable communication between the network device 102 and the network device 104. The PHYs 110 may each comprise a twisted pair PHY capable of operating at one or more standard rates such as 10 Mbps, 100 Mbps, 1 Gbps, and 10 Gbps (10BASE-T, 100GBASE-TX, 1 GBASE-T, and/or 10GBASE-T); potentially standardized rates such as 40 Gbps and 100 Gbps; and/or non-standard rates such as 2.5 Gbps and 5 Gbps. The PHYs 110 may each comprise a backplane PHY capable of operating at one or more standard rates such as 10 Gbps (10GBASE-KX4 and/or 10GBASE-KR); and/or non-standard rates such as 2.5 Gbps and 5 Gbps. The PHYs 110 may each comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. The PHYs 110 may each support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. The PHYs 110 may support point-to-point protocols and/or point-to-multi-point protocols. Non-standard speeds and non-standard technologies, for example, single channel, two channel or four channels may also be supported. Moreover, TDM technologies such as PON at various speeds may be supported by each of the PHYs 110. The PHYs 110 may also comprise suitable logic, circuitry, and/or code operable to implement MACSec protocols.

Each of the PHYs 110 may be operable to implement one or more EEN features, such as low power idle (LPI) or sub-rating in accordance with an EEN control policy. In this regard, hardware, software, and/or firmware residing in each of the PHYs 110 may be operable to implement, or assist with implementing, an EEN control policy. LPI may generally refer a family of EEN features where, instead of transmitting conventional IDLE symbols during periods of inactivity, the PHY 110 may remain silent and/or communicate signals other than conventional IDLE symbols during periods in which there is no data to be communicated. Sub-rating may generally refer to a family of EEN features where the PHYs are reconfigurable, in real-time or near real-time, to communicate at different data rates. One example of sub-rating is subset PHY where the data rate of an Ethernet link may be controlled by enabling and disabling one or more channels of the Ethernet link. The EEN technique(s) may be implemented based on the control policy in order to balance the tradeoff between performance and power consumption in the PHYs 110, the interfaces 114 and 116, and/or on the link 112. In this regard, an EEN control policy associated with a PHY 110 may control which mode the PHY 100 operates in based on various factors and/or conditions.

The Ethernet link 112 is not limited to any specific medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the Ethernet link 112, single mode fiber as well as multi-mode fiber may be utilized. The link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, the number of physical channels via which data is communicated may vary. The link 112 may also comprise one or more wireless links utilizing protocols such as the IEEE 802.11 family of standards.

In operation, latency introduced by the network device 102 in transmitting packets, may be maintained within a determined range of latency introduced by the network device 102 in receiving packets. Similarly, latency introduce by the network device 104 in transmitting packets, may be maintained within a determined range of latency introduced by the network device 102 in receiving packets. In this regard, although it is generally assumed that delay through the OSI and/or TCP/IP stack for transmitted traffic is approximately equal to the delay through the OSI and/or TCP/IP stack for received traffic, the implementation of EEN features may, at least partially, invalidate such an assumption. For example, a network device may be a multimedia client that transmits large amounts of data but receives very little. An EEN policy implemented in such a network device may configure logic, circuitry, and/or code associated with data reception into an low(er)-energy, high(er)-latency mode of operation, but at the same time configure logic, circuitry, and/or code associated with data transmission in a high(er)-energy, low(er)-latency mode of operation.

Accordingly, aspects of the invention may enable implementing one or more configurable delay elements in each of the transmit path and receive path of the PHY 110. In this manner, the delay elements may be controlled such that transmit latency of the network device is approximately equal to receive latency of the network device. Receive latency may be measured, for example, as the amount of time from when a last symbol of a maximum sized packet is received by the PHY 110 via the link 112 until the entire packet has been conveyed up to layer 3 of the OSI model, or the Internet layer of the TCP/IP model. However, the invention is not so limited. Similarly, transmit latency may be measured, for example, as the amount of time from when a maximum sized packet is ready for transmission in OSI layer 3 or TCP/IP Internet layer until the first symbol of the packet has been transmitted onto the link 112; however, the invention is not so limited.

By maintaining transmit latency approximately equal to receive latency, the delay elements in the PHYs may enable higher layers (e.g., layers 2 through 7 of the OSI model, or portions of the network access layer and higher layers of the TCP/IP model) to operate in a conventional manner without having to take the EEN policy into account. For example, the MACs 108 may be able to accurately estimate latency and path distance in each direction based on a single one-way measurement or roundtrip measurement.

Figure 2:
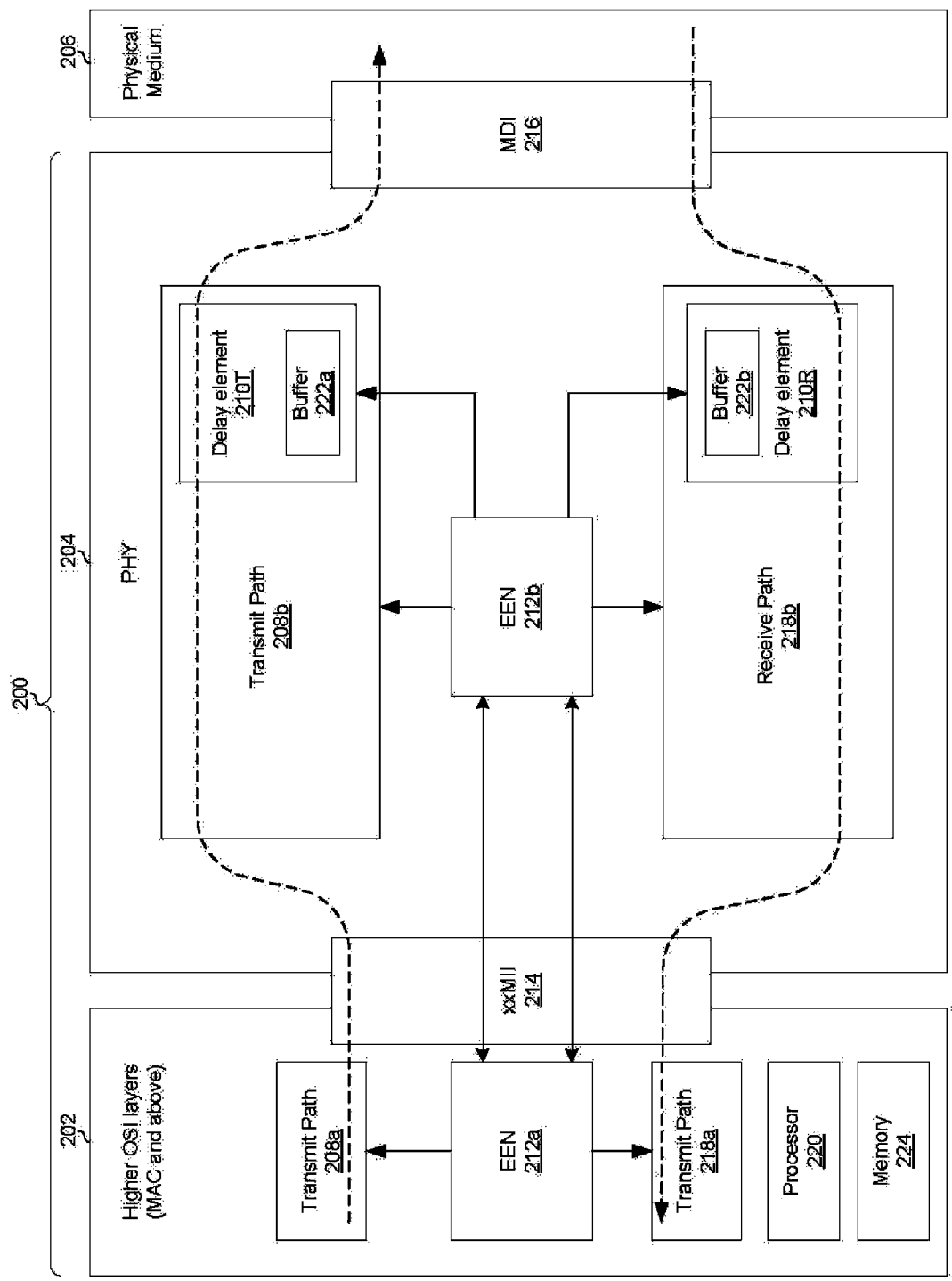
FIG. 2 is a block diagram illustrating a network device that is operable to maintain symmetry between transmit latency and receive latency, in accordance with an embodiment of the invention.

FIG. 2 is a block diagram illustrating a network device that is operable to maintain symmetry between transmit latency and receive latency, in accordance with an embodiment of the invention. Referring to FIG. 2 there is shown a network device 200 comprising a block 202 representing layers above the physical layer in the OSI model, or portions of the network access layer and higher layers in the TCP/IP model, and a PHY 204. The network device 200 may communicate over a physical medium 206. The network device 200 may be similar to or the same as the link partners 102 and 104.

In various embodiments of the invention, the blocks 202 and 204 represent at least a portion of a networking device such as the network devices 102 and 104 described with respect to FIG. 1. The block 202 may comprise processor 220 and memory 224. The PHY 204 may be similar to the PHYs 110 described with respect to FIG. 1.

The processor 220 may comprise suitable logic, circuitry, interfaces, and/or code that may be operable to process data, generate signals, and/or control operation of the block 202 and/or the PHY 204. Furthermore, the processor 220 may be operable to implement an EEN control policy 312. The memory 224 may comprise, for example, RAM, ROM, NVRAM, or flash. The memory 224 may, for example, store instructions that may be executed by the processor 220. The memory 224 may, for example, buffer received and/or to-be-transmitted data.

The transmit path 208 may comprise suitable logic, circuitry, interfaces, and/or code for processing and transmitting data. In this regard, data may originate in the higher OSI or TCP/IP layers and be processed as it gets conveyed through the OSI or TCP/IP layers until corresponding physical symbols are transmitted on the physical medium 206. Although, the transmit path 208 is depicted as blocks 208a and 208b, the transmit path 208 may be comprise any number of logical and/or physical components operating at any of the OSI or TCP/IP layers. The receive path 218 may comprise suitable logic, circuitry, interfaces, and/or code for receiving and processing data. In this regard, data may be received from the physical medium 206 and may be processed as it is conveyed up to higher OSI or TCP/IP layers. Although, the receive path 218 is depicted as blocks 218a and 218b, the receive path 218 may be comprise any number of logical and/or physical components operating at any of the OSI or TCP/IP layers. Furthermore, although the transmit path 208 and receive path are depicted as separate blocks in FIG. 2, the two paths may share one or more resources. That is, the separation between the transmit path 208 and the receive path 218 may be physical, logical, and/or a combination thereof.

The EEN module 212 may comprise suitable logic, circuitry, interfaces, and/or code that may be operable to buffer data, control various operations/functions of the block 202 and/or PHY 204, and/or otherwise process information and generate signals to implement an EEN control policy. In this regard, the EEN module 212 may be operable to generate control signals for configuring the transmit path 208, the receive path 218, the xxMII 214, and/or the MDI 216 for implementing EEN features such as LPI or sub-rating. The EEN module 212 may additionally, or alternatively, be operable to buffer, or control buffering of, received and/or to-be-transmitted data. The EEN module 212 may additionally, or alternatively, be operable to generate, or control generation of, messages for managing and coordinating implementation of EEN features. In this regard, transitioning from one mode of operation to another may require acceptance, cooperation, or at least awareness by a link partner such that communications are not corrupted. In various embodiments of the invention, the EEN module 212 may be implemented in the PHY 204, in the block 202, and/or in a combination of the PHY 204 and the block 202.

The delay elements 210T and 210R may comprise suitable logic, circuitry, interfaces, and/or coder that may be operable to introduce latency into the transmit path 208 and the receive path 218, respectively. In various embodiments of the invention, the delay element 210T may comprise a buffer 222a which may buffer data to be transmitted and the delay element 210R may comprise buffer 222b which may buffer received data. In some embodiments of the invention, the delay elements 210T and 210R may be operable to read, modify, or otherwise process packets. In various embodiments of the invention, the delay elements 210T and 210R may be fixed, variable, or a combination thereof. In either case, the value of the delay may be selected based on, for example, network conditions, past or predicted traffic patterns, and/or parameters communicated among network nodes. Exemplary parameters may include those that are associated with, and/or communicated via, audio video bridging protocols such as IEEE 802.1AS, IEEE 802.1Qat, IEEE 802.1Qay.

In operation, the delay introduced by the delay elements 210T and 210R, and/or functions performed by the delay elements 210T and 210R may be automatically and/or manually programmable and/or may be adaptive and/or dynamically configurable based on signals and/or conditions in the block 202, the PHY 204, and/or one the physical medium 206. In various embodiments of the invention, a delay introduced by the delay elements 210T and 210R may be controlled based on a mode of operation of the PHY 204. In this regard, a delay introduced by the delay element 210T and/or 210R may be determined based on the EEN control policy. For example, the delay elements 210T and 210R may be configured based on whether EEN features are enabled in the PHY 204 and/or which EEN features are enabled in the PHY 204. Exemplary configurations of the PHY 204 and the delay elements 210T and 210R are described below with respect to FIGS. 3A-3D.

In an exemplary embodiment of the invention, controlling the amount of delay introduced by the delay elements 210T and 210R may comprise adjusting a size of one or both of the buffers 222a and 222b, adjusting one or more thresholds of one or both of the buffers 222a and 222b, and/or adjusting a rate at which data is read out of one or both of the buffers 222a and 222b.

In an exemplary embodiment of the invention, the delay introduced by the delay element 210T may be adjusted based on the amount of data stored in the buffer 222b. In this regard, an amount of data stored the buffer 222b may be an indication of the receive latency and the transmit delay may be adjusted based on the indication. Similarly, the delay introduced by the delay element 210R may be adjusted based on the amount of data stored in the buffer 222a. In this regard, an amount of data stored the buffer 222a may be an indication of the transmit latency and the transmit delay may be adjusted based on the indication.

In an exemplary embodiment of the invention, the delay introduced by the delay elements 210T and/or 210R may be controlled based on a type of data, type of packet, and/or type of stream being communicated. In this regard, certain data types, such as multimedia and/or streaming content, may have distinct and/or predictable traffic patterns and the delays elements 210T and/or 210R may be controlled accordingly. For example, for multimedia traffic there may be relatively large amounts of data transmitted and relatively small amounts of data received. Consequently, the transmit latency may increase as a result of the heavy traffic burden while the receive latency may be relatively unaffected. Accordingly, in instances when such multimedia traffic is to be communicated, the delay introduced by the delay element 210R may increased to keep the receive latency approximately equal to the transmit latency.

In an exemplary embodiment of the invention, the delay introduced by the delay elements 210T and/or 210R may be controlled based on past and/or present traffic patterns into and/or out of the PHY 204. For example, indications of traffic patterns over time may be stored in the memory 224 and those indications may be utilized to control the delay introduce by the delay elements 210T and/or 210R.

In an exemplary embodiment of the invention, the delay introduced by the delay elements 210T and/or 210R may be controlled such that the transmit latency and receive latency are approximately constant. In this regard, the transmit latency and receive latency may be constant regardless of whether EEN is enabled. For example, the delay elements 210T and 210R may be controlled to neutralize latency effects of EEN being enabled or disable, varying traffic loads, varying traffic types, and/or any other condition(s) that impact latency.

FIGS. 3A-3D illustrates exemplary controlling of delays in a PHY of a network device to compensate for different modes of operation in the PHY, in accordance with an embodiment of the invention.

Referring to FIG. 3A, there is shown a graph 302 depicting a scenario in which EEN is disabled for both transmit and receive operations. Accordingly, in FIG. 3A, the delay, $\Delta_{TX}$, introduced for outbound traffic is controlled to be equal to the delay, $\Delta_{RX}$, introduced for inbound traffic. In this manner, transmit latency, $L_{TX}+\Delta_{TX}$, and receive latency, $L_{RX}+\Delta_{RX}$, may each be equal to $T_L$. In an exemplary embodiment of the invention, $\Delta_{TX}$ and $\Delta_{RX}$ may be set to minimal values, possibly zero, in the scenario of FIG. 3A.

Referring to FIG. 3B, there is shown a graph 312 depicting a scenario in which EEN is disabled for transmit and enabled for receive. Accordingly, in FIG. 3B, the delay, $\Delta_{TX}$, introduced for outbound traffic is controlled to be longer than the delay, $\Delta_{RX}$, for inbound traffic such that the transmit latency, $L_{TX}+\Delta_{TX}$, and the receive latency, $L_{RX}+\Delta_{RX}$, may each be equal to $T_L$. In an exemplary embodiment of the invention, $\Delta_{RX}$ may be set to a minimal value, possibly zero, in the scenario of FIG. 3B.

Referring to FIG. 3C, there is shown a graph 322 depicting a scenario in which EEN is enabled for transmit and disabled for receive. Accordingly, in FIG. 3C, the delay, $\Delta_{RX}$, introduced for inbound traffic is controlled to be longer than the delay, $\Delta_{TX}$, for outbound traffic such that the transmit latency, $L_{TX}+\Delta_{TX}$, and the receive latency, $L_{RX}+\Delta_{RX}$, may each be equal to $T_L$. In an exemplary embodiment of the invention, $\Delta_{TX}$ may be set to a minimal value, possibly zero, in the scenario of FIG. 3C.

Referring to FIG. 3D, there is shown a graph 332 depicting a scenario in which EEN is enabled for both transmit and receive operations. Accordingly, in FIG. 3D, the delay, $\Delta_{TX}$, introduced for outbound traffic is controlled to be equal to the delay, $\Delta_{RX}$, introduced for inbound traffic. In this manner, transmit latency, $L_{TX}+\Delta_{TX}$, and receive latency, $L_{RX}+\Delta_{RX}$, may each be equal to $T_L$. In an exemplary embodiment of the invention, $\Delta_{TX}$ and $\Delta_{RX}$ may be set to minimal values, possibly zero, in the scenario of FIG. 3A.

In some instances, a network device may transition between the various scenarios depicted in FIGS. 3A-3D. In such instances, the transitions may be controlled such that the delays may be adjusted gradually over time. For illustration, consider a transition from the scenario in FIG. 3B to the scenario in FIG. 3A. In the scenario of FIG. 3B, the buffer 222A may be of a first longer length and in the scenario of FIG. 3A the buffer 222A may be of a second shorter length. Accordingly, the buffer 222A may begin gradually transitioning from the longer value to the shorter value. For example, memory may be deallocated from the buffer 222A, or one or more buffer pointers may be changed only on clock cycles in which data is not written into the buffer 222A but may remain the same on clock cycles in which data is written into the buffer 222A. Additionally or alternatively, a clock utilized to read data out of the buffer may be temporarily sped up, or additional cycles of a clock may be utilized for reading data out of the buffer, to drain the buffer 222A and reduce its size.

Figure 4:
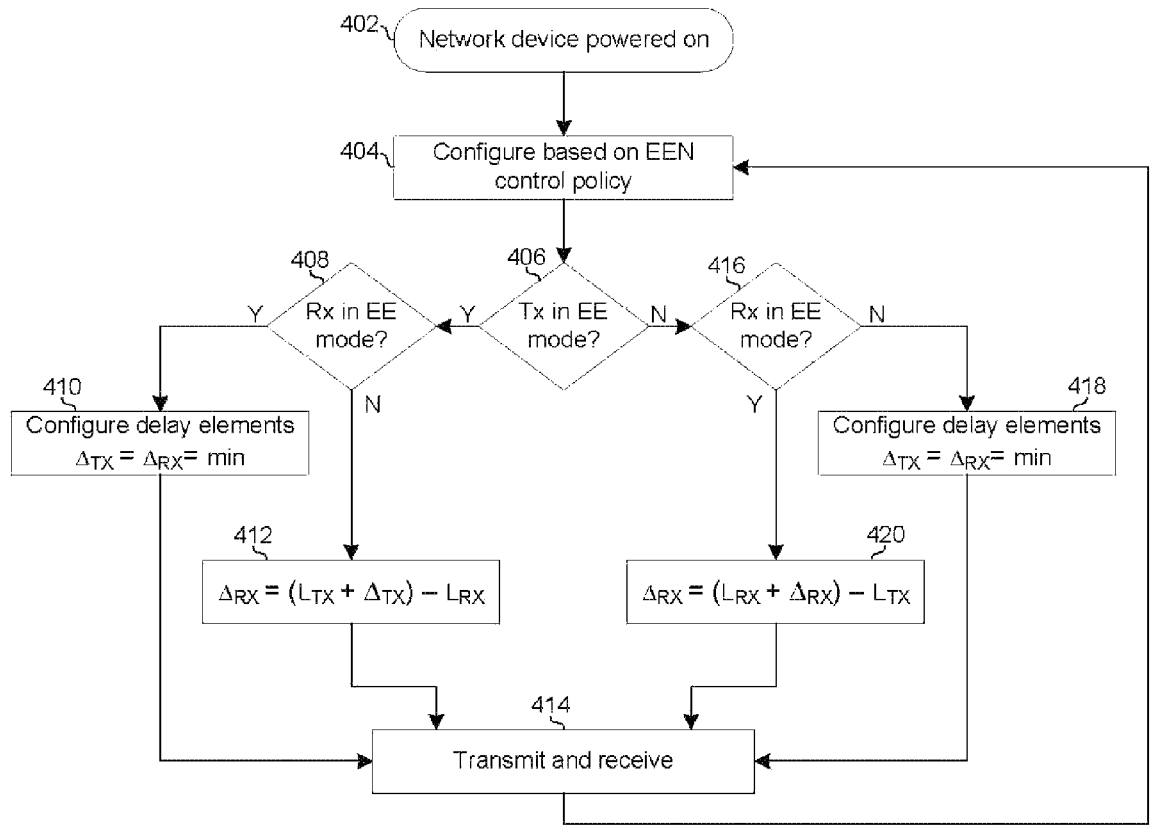
FIG. 4 is a flowchart illustrating exemplary steps for controlling delays introduced by a PHY of a network device based on a mode of operation of the network device, in accordance with an embodiment of the invention.

FIG. 4 is a flowchart illustrating exemplary steps for controlling delays introduced by a PHY of a network device based on a mode of operation of the network device, in accordance with an embodiment of the invention. Referring to FIG. 4, the exemplary steps may begin with step 402 when the network device 200 is powered up and/or connected to a link partner. In step 404, the network device 200 may be configured based on its EEN control policy. In this regard, one or more EEN features may be enabled or disabled for the transmit path 208 and/or the receive path 218 based on any number of factors. In step 406, it may be determined whether one or more EEN features are enabled for transmit operations. In instances that one or more EEN features are implemented for transmit operations, the exemplary steps may advance to step 408. In step 408, it may be determined whether one or more EEN features are enabled for receive operations. In instances that one or more EEN features are implemented for receive operations, the exemplary steps may advance to step 410. In step 410, the delay elements 201T and 210R may be configured such that each may introduce approximately the same amount of delay.

In an exemplary embodiment, the delay elements 210T and 210R may each be configured to introduce a minimum delay, which may ideally be zero. In step 414 the network device 200 may transmit and/or receive packets in accordance with its current configuration. In some embodiments of the invention, the delay elements 210T and 210R may be dynamically adjusted during operation based on various monitored conditions and/or events. The exemplary steps may return to step 404 when the EEN control policy triggers a transition to a different mode of operation.

Returning to step 408, in instances that one or more EEN features are implemented for receive operations, the exemplary steps may advance to step 412. In step 412, the delay element 210R may be configured to introduce a longer delay than the delay element 210T. In this manner, the delay elements 210T and 210R may be configured to compensate for the difference in latency that may arise from the transmit path 208 being in an EEN mode and the receive path 218 not being in an EEN mode.

Returning to step 406, in instances that one or more EEN features are implemented for transmit operations, the exemplary steps may advance to step 416. In step 416, it may be determined whether one or more EEN features are enabled for receive operations. In instances that one or more EEN features are implemented for receive operations, the exemplary steps may advance to step 420. In step 420, the delay element 210T may be configured to introduce a longer delay than the delay element 210R. In this manner, the delay elements 210T and 210R may be configured to compensate for the difference in latency that may arise from the receive path 218 being in an EEN mode and the transmit path 208 not being in an EEN mode.

Returning to step 416, in instances that one or more EEN features are not implemented for receive operations, the exemplary steps may advance to step 418. In step 418, the delay elements 201T and 210R may be configured such that the each may introduce approximately the same amount of delay. In an exemplary embodiment, the delay elements 210T and 210R may each be configured to introduce a minimum delay, which may ideally be zero.

Various aspects of a method and system for symmetric transmit and receive latencies in an energy efficient PHY are provided. In an exemplary embodiment of the invention, a delay introduced by a PHY 204 of a network device 200 for outbound traffic and a delay introduced by the PHY 204 for inbound traffic may be controlled such that a transmit delay of the network device 200 is substantially equal to a receive latency of the network device 200. The PHY 204 may be an Ethernet PHY. The delay for inbound traffic may be introduced via a delay element 210R and the delay for outbound traffic may be introduced via a delay element 210T. The delays may be controlled based on whether one or more energy efficiency features are enabled in the PHY 204. The delays may be controlled by controlling a size of one or more buffers 222, a threshold of one or more buffers 222, and/or a rate at which data is read out of one or more buffers 222. The delay introduced by the PHY for outbound traffic may be controlled based on an amount of buffered inbound traffic. The delay introduced by the PHY for inbound traffic may be controlled based on an amount of buffered outbound traffic. The delays may be controlled based on a type of traffic being communicated by the network device 200 and/or based on traffic patterns into and/or out of the PHY 204. The delays may be controlled such that the receive latency and the transmit latency are approximately constant regardless of a mode of operation of the network device.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for symmetric transmit and receive latencies in an energy efficient PHY.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
  determining, by a network device comprising one or more circuits, a difference between a first amount of latency in a first path within a physical layer device of the network device in a first direction and a second amount of latency in a second path within the physical layer device in a second direction; and
  adjusting, by the network device, an amount of delay in the first path within the physical layer device in the first direction using the determined difference,
  wherein the adjusting the amount of delay comprises controlling one or more buffers of the network device.

2. The method of claim 1, wherein the first path is a transmit path and the second path is a receive path.

3. The method of claim 1, wherein the first path is a receive path and the second path is a transmit path.

4. The method of claim 1, wherein the adjusting the amount of delay further comprises at least one of controlling a size of the one or more buffers, controlling one or more thresholds of the one or more buffers, or controlling a rate at which data is read out of the one or more buffers.

5. The method of claim 1, wherein the adjusting the amount of delay further comprises controlling a delay introduced by the physical layer device for outbound traffic using an amount of buffered inbound traffic.

6. The method of claim 1, wherein the adjusting the amount of delay further comprises controlling a delay introduced by the physical layer device for inbound traffic using an amount of buffered outbound traffic.

7. The method of claim 1, wherein the adjusting the amount of delay further comprises controlling a delay using a type of traffic.

8. The method of claim 1, wherein the adjusting the amount of delay further comprises controlling a delay using traffic patterns.

9. The method of claim 1, wherein the adjusting the amount of delay further comprises adjusting the amount of delay in the first path within the physical layer device such that the first amount of latency in the first path within the physical layer device is substantially equal to the second amount of latency in the second path within the physical layer device.

10. A network device, comprising:
    one or more circuits, one or more processors, or any combination thereof configured to:
    determine a difference between a first amount of latency in a first path within a physical layer device of the network device in a first direction and a second amount of latency in a second path within the physical layer device in a second direction; and
    adjust, based on an energy efficiency control policy that controls energy efficient network features of the physical layer device, an amount of delay in the first path within the physical layer device in the first direction using the determined difference,
    wherein the adjusting the amount of delay comprises controlling one or more buffers of the network device.

11. The network device of claim 10, wherein the first path is a transmit path and the second path is a receive path.

12. The network device of claim 10, wherein the first path is a receive path and the second path is a transmit path.

13. The network device of claim 10, wherein the energy efficiency control policy controls entry by the physical layer device into one of low power idle and sub-rating.

14. The network device of claim 10, further comprising the one or more circuits, the one or more processors, or any combination thereof configured to control at least one of a size of the one or more buffers, one or more thresholds of the one or more buffers, or a rate at which data is read out of the one or more buffers.

15. The network device of claim 10, further comprising the one or more circuits, the one or more processors, or any combination thereof configured to control a delay introduced by the physical layer device for outbound traffic using an amount of buffered inbound traffic.

16. The network device of claim 10, further comprising the one or more circuits, the one or more processors, or any combination thereof configured to control a delay introduced by the physical layer device for inbound traffic using an amount of buffered outbound traffic.

17. The network device of claim 10, further comprising the one or more circuits, the one or more processors, or any combination thereof configured to control a delay using a type of traffic.

18. The network device of claim 10, further comprising the one or more circuits, the one or more processors, or any combination thereof configured to control a delay using traffic patterns.

19. The network device of claim 10, further comprising the one or more circuits, the one or more processors, or any combination thereof configured to adjust the amount of delay in the first path within the physical layer device such that the first amount of latency in the first path within the physical layer device is substantially equal to the second amount of latency in the second path within the physical layer device.

20. A method performed by a network device, comprising:
    determining a difference between a first amount of latency in a first path within a physical layer device in a first direction and a second amount of latency in a second path within the physical layer device in a second direction; and
    adjusting, by an energy efficiency control policy module that controls energy efficient network features of the physical layer device of the network device, an amount of delay in the first path within the physical layer device in the first direction, the amount of delay being adjusted using the difference,
    wherein the adjusting the amount of delay comprises at least one of:
    controlling at least one of: a size of one or more buffers, one or more thresholds of the one or more buffers, or a rate at which data is read out of the one or more buffers;
    controlling a delay introduced by the physical layer device for outbound traffic using an amount of buffered inbound traffic;
    controlling a delay introduced by the physical layer device for inbound traffic using an amount of buffered outbound traffic;
    controlling a delay using a type of traffic; or
    controlling a delay using traffic patterns.

* * * * *